United States Patent
Watanabe

(10) Patent No.: US 11,701,824 B2
(45) Date of Patent: Jul. 18, 2023

(54) PLASTICIZING APPARATUS, PLASTICIZING METHOD, AND THREE-DIMENSIONAL SHAPING APPARATUS

(71) Applicant: SEIKO EPSON CORPORATION, Tokyo (JP)

(72) Inventor: Manabu Watanabe, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 193 days.

(21) Appl. No.: 16/773,559

(22) Filed: Jan. 27, 2020

(65) Prior Publication Data

US 2020/0238612 A1 Jul. 30, 2020

(30) Foreign Application Priority Data

Jan. 28, 2019 (JP) ................. 2019-012011

(51) Int. Cl.
*B29C 48/00* (2019.01)
*B29C 64/209* (2017.01)
*B33Y 30/00* (2015.01)
*B29C 64/393* (2017.01)
*B33Y 50/02* (2015.01)

(52) U.S. Cl.
CPC ............ *B29C 64/209* (2017.08); *B33Y 30/00* (2014.12); *B29C 64/393* (2017.08); *B33Y 50/02* (2014.12)

(58) Field of Classification Search
CPC ..... B29C 64/209; B29C 64/393; B33Y 30/00; B33Y 50/02
See application file for complete search history.

(56) References Cited

U.S. PATENT DOCUMENTS

| 4,770,623 A * | 9/1988 | Gutjahr .................. B29C 45/74 425/207 |
| 2007/0184146 A1* | 8/2007 | Takeuchi .............. B29C 45/464 425/451.9 |
| 2018/0311894 A1 | 11/2018 | Saito et al. |

FOREIGN PATENT DOCUMENTS

| JP | S4860762 A | 8/1973 |
| JP | S61-262107 A | 11/1986 |
| JP | H03-153311 A | 7/1991 |
| JP | H04-073124 A | 3/1992 |
| JP | H08-001731 A | 1/1996 |
| JP | H10230542 A | 9/1998 |
| JP | 2007-245503 A | 9/2007 |
| JP | 2010-000752 A | 1/2010 |
| JP | 2018187777 A | 11/2018 |

OTHER PUBLICATIONS

Office Action for JP Patent Application No. JP2019012011, dated Sep. 27, 2022, 6 pages of Office Action.

* cited by examiner

*Primary Examiner* — Ryan M Ochylski
(74) *Attorney, Agent, or Firm* — Chip Law Group

(57) ABSTRACT

A plasticizing apparatus for plasticizing a material to form a molten material includes a screw having a groove formed face, in which a groove portion in a spiral shape to be supplied with the material is formed, and a first heating portion heating the material, and a barrel having a screw opposed face, which is a face opposed to the groove formed face, and in which a sending-out hole for sending out the molten material is formed at a center, and a second heating portion heating the material.

6 Claims, 6 Drawing Sheets

FIG. 6

| | MATERIAL | CRYSTALLINE or AMORPHOUS | THERMAL DECOMPOSITION TEMPERATURE Td [°C] | MELTING POINT Tm [°C] | GLASS TRANSITION POINT Tg [°C] | BARREL SURFACE TEMPERATURE Tb [°C] | SCREW SURFACE TEMPERATURE Ts [°C] | (Ts−Tg)/(Tm−Tg) | EJECTION PROPERTY |
|---|---|---|---|---|---|---|---|---|---|
| SAMPLE 1 | PEEK | CRYSTALLINE | 450 | 341 | 143 | 400 | 180 | 0.187 | A |
| SAMPLE 2 | PEEK | CRYSTALLINE | 450 | 341 | 143 | 350 | 160 | 0.086 | C |
| SAMPLE 3 | PEEK | CRYSTALLINE | 450 | 341 | 143 | 383 | 170 | 0.136 | B |
| SAMPLE 4 | PP | CRYSTALLINE | 300 | 165 | 0 | 210 | 87 | 0.527 | A |
| SAMPLE 5 | ABS | AMORPHOUS | 260 | — | 80 | 210 | 87 | — | A |

PLASTICIZING APPARATUS, PLASTICIZING METHOD, AND THREE-DIMENSIONAL SHAPING APPARATUS

The present application is based on, and claims priority from JP Application Serial Number 2019-012011, filed on Jan. 28, 2019, the disclosure of which is hereby incorporated by reference herein in its entirety.

BACKGROUND

1. Technical Field

The present disclosure relates to a plasticizing apparatus, a plasticizing method, and a three-dimensional shaping apparatus.

2. Related Art

For example, JP-A-2010-000752 (Patent Document 1) discloses an apparatus including a barrel in which a heater is embedded, and a screw rotating on the barrel. In this apparatus, a material is supplied between the barrel and the screw, and the supplied material is melted by heating using the heater.

In the above-mentioned apparatus, the heater is provided in the barrel, and therefore, when the temperature of the heater is set high for appropriately melting the material in the vicinity of the screw, the temperature in the vicinity of the barrel becomes too high, and the material in the vicinity of the barrel is deteriorated, and discoloration or a decrease in strength of the material sent out from the apparatus may be caused. On the other hand, when the temperature of the heater is set low for appropriately maintaining the temperature in the vicinity of the barrel, the temperature in the vicinity of the screw becomes too low, and the material in the vicinity of the screw cannot be appropriately melted, and sending-out of the material from the apparatus may become unstable. In view of this, a technique capable of stably sending out a material by melting while suppressing deterioration of the material is provided.

SUMMARY

According to one aspect of the present disclosure, a plasticizing apparatus for plasticizing a material to form a molten material is provided. The plasticizing apparatus includes a screw having a groove formed face, in which a groove portion in a spiral shape to be supplied with the material is formed, and a first heating portion heating the material, and a barrel having a screw opposed face, which is a face opposed to the groove formed face, and in which a sending-out hole for sending out the molten material is formed at a center, and a second heating portion heating the material.

BRIEF DESCRIPTION OF THE DRAWINGS

FIG. 6 is an explanatory view showing test results related to temperatures and an ejection property of a shaping material from a nozzle.

DESCRIPTION OF EXEMPLARY EMBODIMENTS

A. First Embodiment

Figure 1:
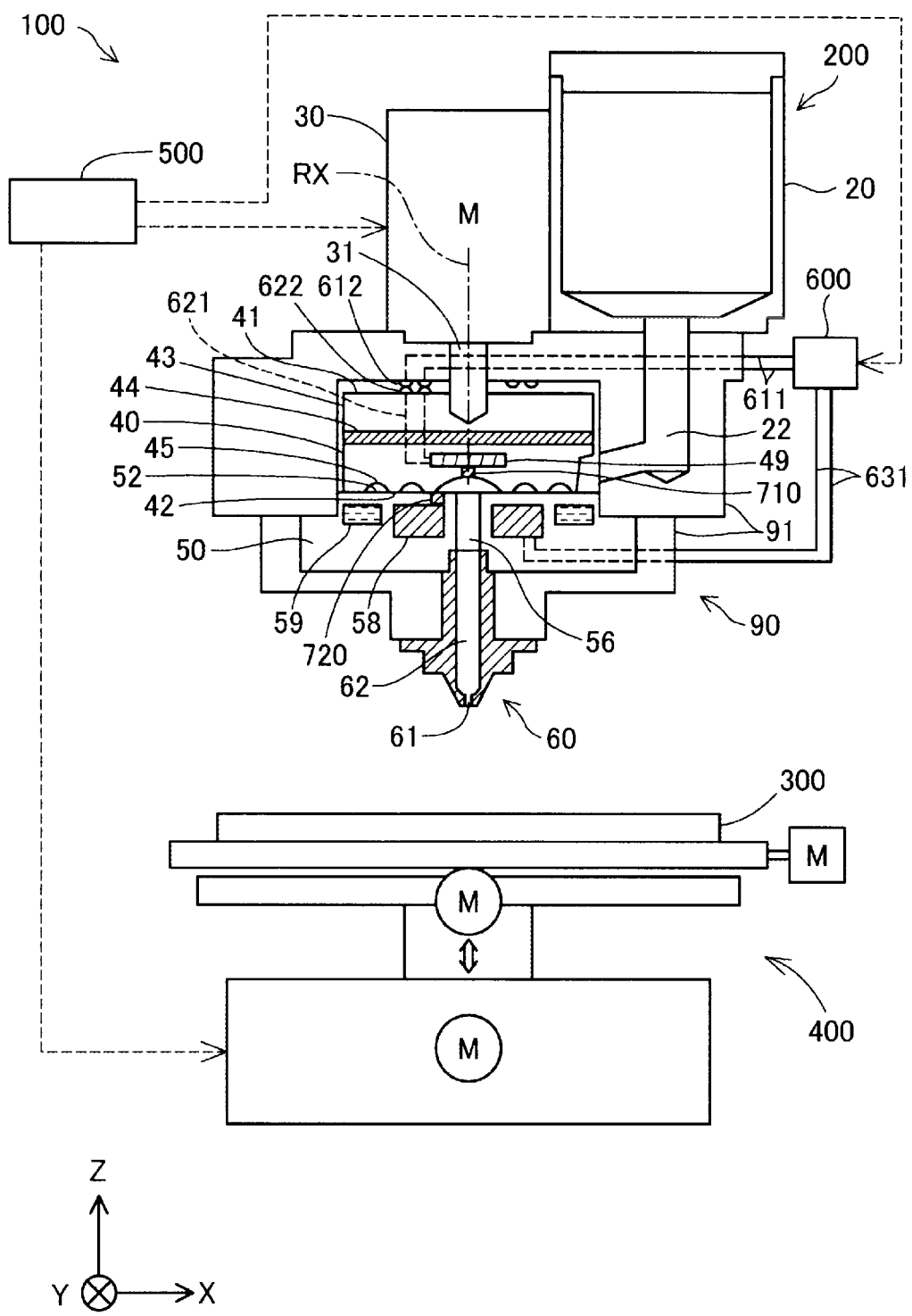
FIG. 1 is an explanatory view showing a schematic configuration of a three-dimensional shaping apparatus in a first embodiment.

FIG. 1 is an explanatory view showing a schematic configuration of a three-dimensional shaping apparatus 100 in a first embodiment. In FIG. 1, arrows along the X, Y, and Z directions orthogonal to one another are shown. The X direction and the Y direction are directions along the horizontal direction, and the Z direction is a direction along the vertical direction. In also the other drawings, arrows along the X, Y, and Z directions are shown as appropriate. The X, Y, and Z directions in FIG. 1 and the X, Y, and Z directions in the other drawings indicate the same directions.

The three-dimensional shaping apparatus 100 in this embodiment includes an ejection unit 200, a shaping table 300, a moving mechanism 400, a controller 500, and a power supply source 600. The ejection unit 200 includes a material supply portion 20, a plasticizing portion 90, and a nozzle 60. In the three-dimensional shaping apparatus 100 in this embodiment, a material supplied from the material supply portion 20 is plasticized by the plasticizing portion 90 under the control of the controller 500. The material plasticized by the plasticizing portion 90 is sent out from the plasticizing portion 90 as a shaping material and supplied to the nozzle 60. The shaping material supplied to the nozzle 60 is ejected onto the shaping table 300 from a nozzle hole 61 provided at a tip portion of the nozzle 60. By stacking the shaping material ejected from the nozzle hole 61 on the shaping table 300, a three-dimensional shaped article is shaped. The shaping material is sometimes referred to as "molten material". The plasticizing portion 90 is sometimes referred to as "plasticizing apparatus".

The moving mechanism 400 changes a relative position of the shaping table 300 and the ejection unit 200. In this embodiment, the moving mechanism 400 moves the shaping table 300 with respect to the ejection unit 200. The moving mechanism 400 in this embodiment is constituted by a three-axis positioner for moving the shaping table 300 in three axis directions of the X, Y, and Z directions by driving forces of three motors. Each motor drives under the control of the controller 500. The moving mechanism 400 need not be configured to move the shaping table 300, but may be configured to move the ejection unit 200 without moving the shaping table 300. The moving mechanism 400 may be configured to move both the shaping table 300 and the ejection unit 200.

The controller 500 is constituted by a computer including one or more processors, a main storage device, and an input/output interface for performing signal input/output to/from the outside. In this embodiment, the controller 500 controls the operation of the ejection unit 200 and the moving mechanism 400 by execution of a program or a command read on the main storage device by the processor and executes a shaping process for shaping a three-dimensional shaped article. In the operation, movement of a three-dimensional relative position of the ejection unit 200 with respect to the shaping table 300 is included. The controller 500 may be constituted by a combination of a plurality of circuits instead of a computer.

In the material supply portion 20, a material in a state of a pellet, a powder, or the like is housed. In this embodiment, polyether ether ketone (PEEK) in a pellet form is used as the material. Polyether ether ketone is a crystalline thermoplastic resin. The material supply portion 20 in this embodiment is constituted by a hopper. The material housed in the material supply portion 20 is supplied to the plasticizing portion 90 through a supply channel 22 provided below the material supply portion 20.

The plasticizing portion 90 includes a driving motor 30, a flat screw 40, a barrel 50, and a screw case 91. The plasticizing portion 90 supplies a shaping material in a paste form formed by melting at least a part of the material in a solid state supplied from the material supply portion 20 to the nozzle 60. The flat screw 40 is sometimes simply referred to as "screw". The screw case 91 is sometimes simply referred to as "case".

The screw case 91 houses the flat screw 40. To an upper face of the screw case 91, the driving motor 30 is fixed. A rotating shaft 31 of the driving motor 30 is coupled to an upper face 41 of the flat screw 40.

The flat screw 40 has a substantially columnar shape whose height in a direction along a central axis RX is smaller than the diameter. The flat screw 40 is disposed in the screw case 91 so that the central axis RX becomes parallel to the Z direction. The flat screw 40 rotates around the central axis RX in the screw case 91 by a torque generated by the driving motor 30.

The flat screw 40 has a groove formed face 42 at an opposite side to the upper face 41 in a direction along the central axis RX. In the groove formed face 42, a groove portion 45 is formed. A detailed configuration of the groove formed face 42 of the flat screw 40 will be described later with reference to FIG. 2.

The flat screw 40 in this embodiment has a built-in screw heater 49 for heating the material supplied to the groove portion 45. The temperature of the screw heater 49 is controlled by the controller 500. To the screw heater 49, an electric powder is supplied from the power supply source 600. The screw heater 49 is sometimes referred to as "first heating portion".

In this embodiment, a screw temperature sensor 710 is provided at a surface of the groove portion 45 on the central axis RX of the flat screw 40. That is, the screw temperature sensor 710 is provided at the center in a circumferential direction of the flat screw 40. The screw temperature sensor 710 acquires a screw surface temperature Ts that is the surface temperature of the groove portion 45 in the flat screw 40. As the screw temperature sensor 710, for example, a thermocouple can be used. The information regarding the screw surface temperature Ts acquired by the screw temperature sensor 710 is transmitted to the controller 500.

The flat screw 40 has a heat insulating portion 44 at a position more distant from the barrel 50 than the screw heater 49. A detailed configuration of the heat insulating portion 44 will be described later with reference to FIG. 4.

The barrel 50 is fixed below the flat screw 40 in the screw case 91. The barrel 50 has a screw opposed face 52 opposed to the groove formed face 42 of the flat screw 40. In the screw opposed face 52, a sending-out hole 56 communicating with the nozzle hole 61 is provided at a position on the central axis RX of the flat screw 40. A detailed configuration of the screw opposed face 52 of the barrel 50 will be described later with reference to FIG. 3.

The barrel 50 has a built-in barrel heater 58 at a position opposed to the groove portion 45 of the flat screw 40. The temperature of the barrel heater 58 is controlled by the controller 500. To the barrel heater 58, an electric powder is supplied from the power supply source 600. The barrel heater 58 is sometimes referred to as "second heating portion".

In this embodiment, a barrel temperature sensor 720 is provided in an outer circumferential portion of the sending-out hole 56 in the screw opposed face 52 of the barrel 50. The barrel temperature sensor 720 acquires a barrel surface temperature Tb that is the surface temperature of the screw opposed face 52 in the barrel 50. As the barrel temperature sensor 720, for example, a thermocouple can be used. The information regarding the barrel surface temperature Tb acquired by the barrel temperature sensor 720 is transmitted to the controller 500.

In this embodiment, a cooling water channel 59 is provided at an outer circumferential side of the barrel heater 58 in the barrel 50. In the cooling water channel 59, cooling water circulates by a pump (not shown) so as to prevent the temperature of the barrel 50 from becoming too high. The cooling water channel 59 may be provided in the vicinity of the barrel 50 in the screw case 91 instead of in the barrel 50. The cooling water channel 59 need not be provided.

In a face opposed to the upper face 41 of the flat screw 40 in the screw case 91, a first contact point 612 is provided. The power supply source 600 and the first contact point 612 are electrically coupled to each other through a first wiring 611. In the upper face 41 of the flat screw 40, a second contact point 622 is provided so as to come into contact with the first contact point 612. The second contact point 622 and the screw heater 49 are electrically coupled to each other through a second wiring 621. The power supply source 600 and the barrel heater 58 are electrically coupled to each other through a third wiring 631. A detailed configuration of a case contact point will be described later with reference to FIG. 4.

In the nozzle 60, a nozzle channel 62 and a nozzle hole 61 are provided. In the nozzle channel 62, the shaping material is supplied from the sending-out hole 56 of the plasticizing portion 90. The nozzle hole 61 is a portion with a reduced channel cross section provided at an end portion at a side communicating with the atmosphere of the nozzle channel 62. The forming material supplied to the nozzle channel 62 is ejected from the nozzle hole 61. In this embodiment, the nozzle 60 is provided with the nozzle hole 61 in a circular shape. The diameter of the nozzle hole 61 is referred to as "nozzle diameter Dn". The shape of the nozzle hole 61 is not limited to a circular shape, and may be a quadrangular shape or the like.

Figure 2:
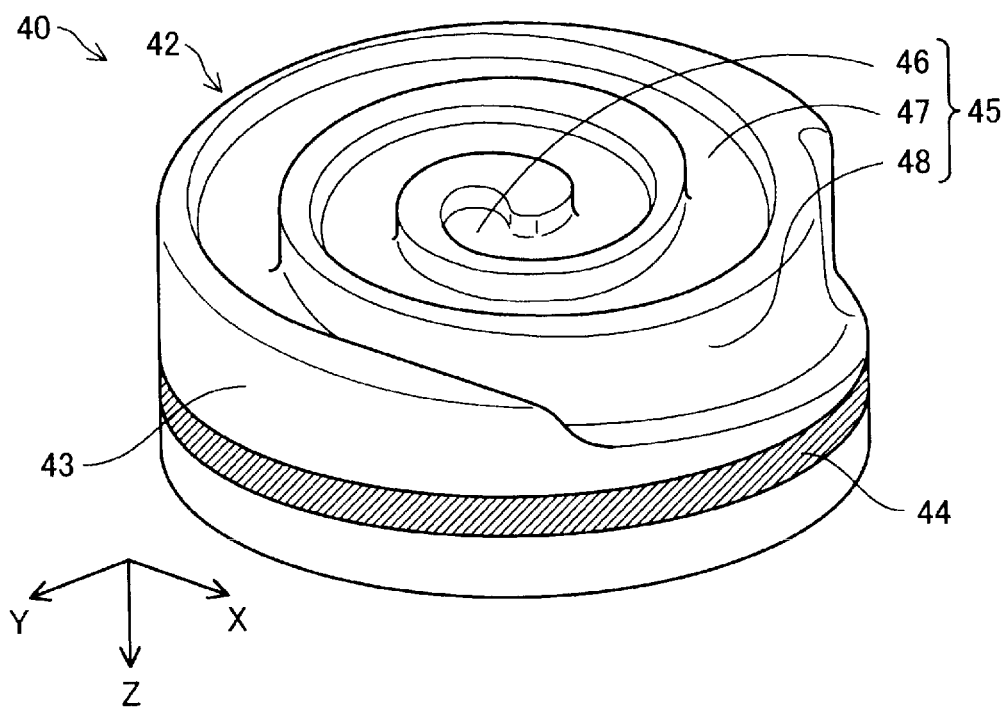
FIG. 2 is a perspective view showing a configuration of a groove formed face of a flat screw in the first embodiment.

FIG. 2 is a perspective view showing a configuration of the groove formed face 42 of the flat screw 40 in this embodiment. The flat screw 40 shown in FIG. 2 is shown in a state where the vertical positional relationship shown in FIG. 1 is reversed for facilitating the understanding of the technique. In the groove formed face 42 of the flat screw 40, the groove portion 45 is formed as described above. The groove portion 45 includes a central portion 46, a spiral portion 47, and a material introduction portion 48.

The central portion 46 is a circular recess formed around the central axis RX of the flat screw 40. The central portion 46 is opposed to the sending-out hole 56 provided in the barrel 50.

The spiral portion 47 is a groove extending in a spiral shape so as to draw an arc toward the outer circumference of the groove formed face 42 with the central portion 46 as the center. The spiral portion 47 may be configured to extend in an involute curve shape or in a helical shape. One end of the spiral portion 47 is coupled to the central portion 46. The other end of the spiral portion 47 is coupled to the material introduction portion 48.

The material introduction portion 48 is a groove that is provided at the outer peripheral edge of the groove formed face 42 and that is wider than the spiral portion 47. The material introduction portion 48 is continuous to a side face 43 of the flat screw 40. The material introduction portion 48 introduces the material supplied from the material supply portion 20 into the spiral portion 47 through the supply channel 22. In FIG. 2, a form in which a single streak of spiral portion 47 and a single streak of material introduction portion 48 are provided toward the outer circumference from the central portion 46 of the flat screw 40 is shown, however, a plurality of streaks of spiral portions 47 and a plurality of streaks of material introduction portions 48 may be provided toward the outer circumference from the central portion 46 of the flat screw 40.

Figure 3:
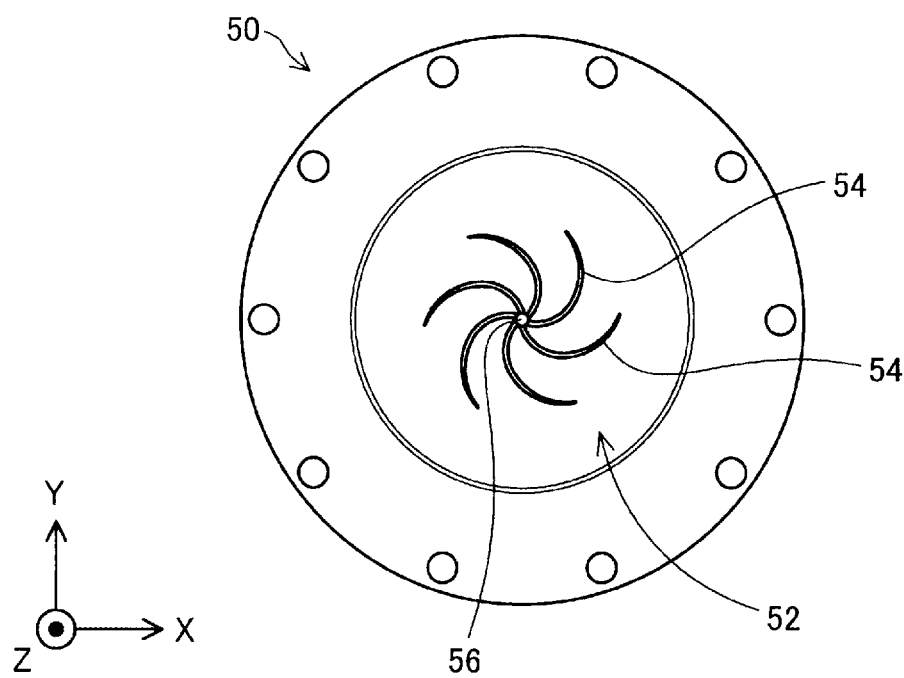
FIG. 3 is a top view showing a configuration of a screw opposed face of a barrel in the first embodiment.

FIG. 3 is a top view showing a configuration of the screw opposed face 52 of the barrel 50 in this embodiment. As described above, at the center of the screw opposed face 52, the sending-out hole 56 communicating with the nozzle 60 is formed. Around the sending-out hole 56 in the screw opposed face 52, a plurality of guide grooves 54 are formed. One end of each of the guide grooves 54 is coupled to the sending-out hole 56, and each guide groove 54 extends in a spiral shape toward the outer circumference of the screw opposed face 52 from the sending-out hole 56. Each guide groove 54 has a function of guiding the shaping material to the sending-out hole 56.

Figure 4:
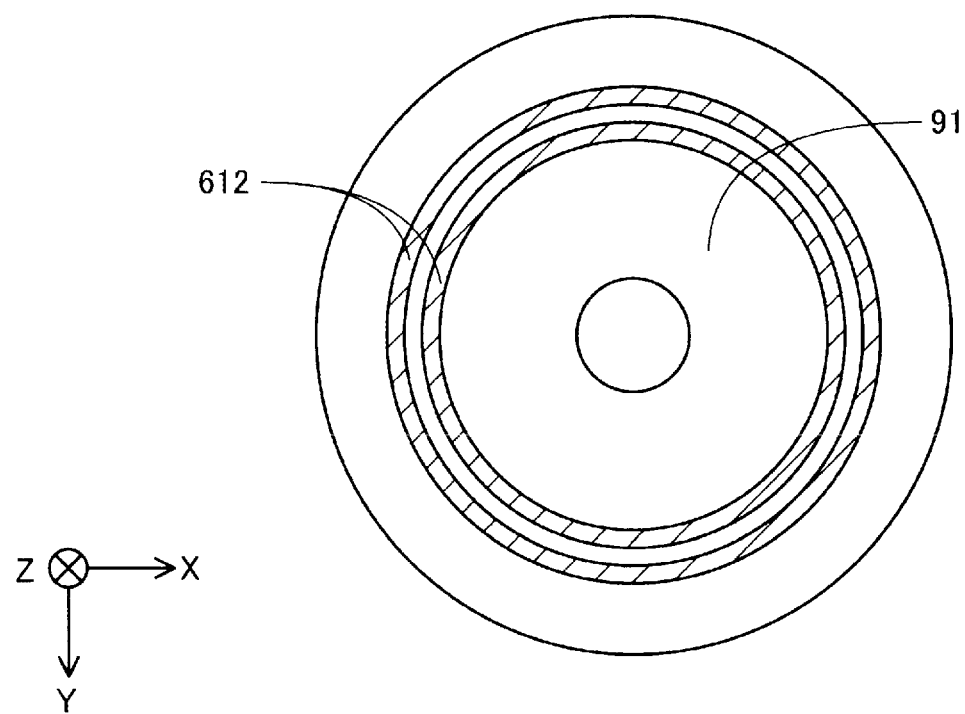
FIG. 4 is a bottom view showing a configuration of a first contact point in the first embodiment.

FIG. 4 is a bottom view showing a configuration of the first contact point 612 in this embodiment. In this embodiment, the first contact point 612 is formed in an annular shape. The center of the first contact point 612 is located on the central axis RX of the flat screw 40. The radius of the first contact point 612 is equal to a distance from the second contact point 622 to the central axis RX of the flat screw 40. Therefore, even during the rotation of the flat screw 40, a state where the first contact point 612 and the second contact point 622 are in contact with each other is ensured, and an electric power is supplied from the power supply source 600 to the screw heater 49. The first contact point 612 need not be formed in an annular shape. It is only necessary that at least one of the first contact point 612 and the second contact point 622 be formed into an annular shape, and the first contact point 612 and the second contact point 622 come into contact with each other so as to achieve electrical coupling between the first contact point 612 and the second contact point 622.

Figure 5:
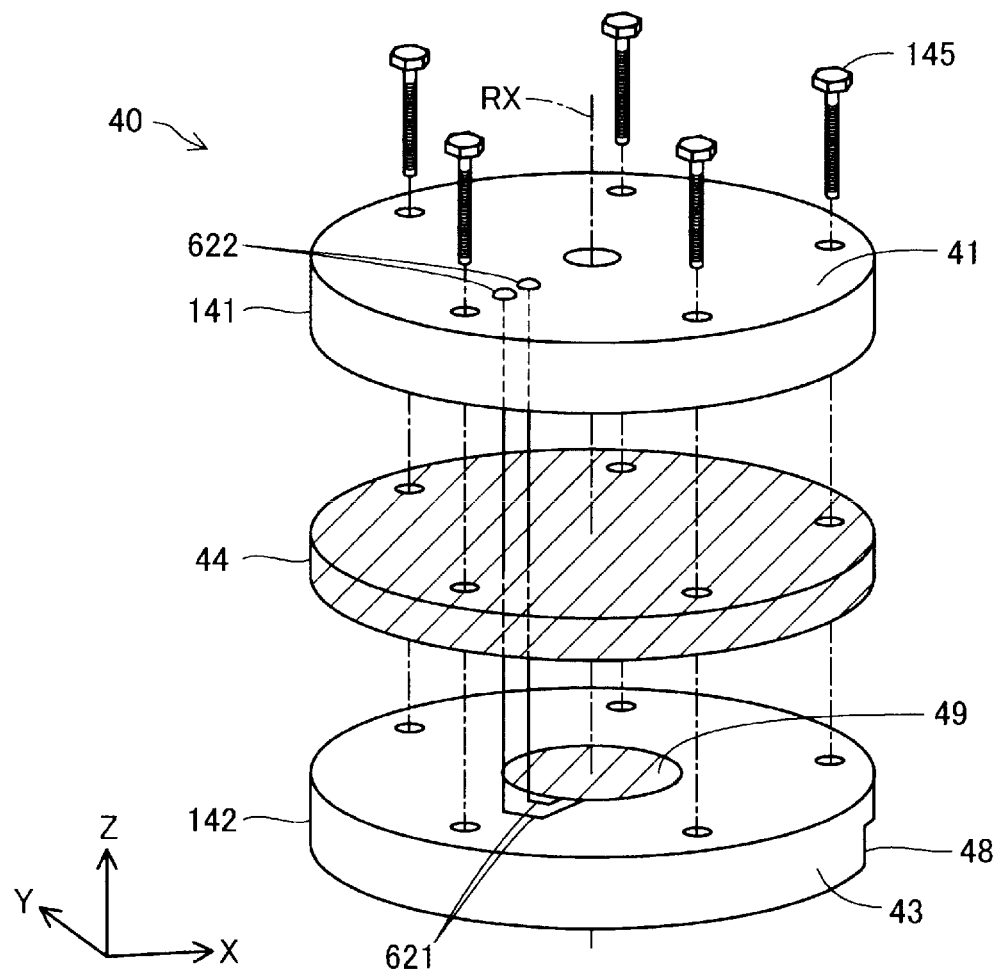
FIG. 5 is an exploded perspective view showing a configuration of the flat screw in the first embodiment.

FIG. 5 is an exploded perspective view showing a configuration of the flat screw 40 in this embodiment. The flat screw 40 in this embodiment has a first body portion 141, a second body portion 142, and the heat insulating portion 44, and these are joined to one another by a bolt 145. The first body portion 141 is a portion having the upper face 41 in the flat screw 40. The second body portion 142 is a portion having the groove formed face 42 in the flat screw 40. The second body portion 142 has the built-in screw heater 49. The heat insulating portion 44 is a portion that is provided between the first body portion 141 and the second body portion 142 and that has a lower thermal conductivity than the second body portion 142. The first body portion 141, the second body portion 142, and the heat insulating portion 44 may be mechanically joined by a rivet or the like, or may be joined by welding, adhesion, or the like.

In this embodiment, the first body portion 141 and the second body portion 142 are formed from stainless steel, and the heat insulating portion 44 is formed from zirconia. The first body portion 141 and the second body portion 142 of the flat screw 40 may be formed from, for example, another metal material such as a titanium alloy, a resin material, or a ceramic material. The heat insulating portion 44 may be formed from a material other than zirconia as long as it is a material having a lower thermal conductivity than the second body portion 142.

According to the configuration of the three-dimensional shaping apparatus 100 described above, when the shaping process for shaping a three-dimensional shaped article is executed by the controller 500, the material in the material supply portion 20 is supplied to the material introduction portion 48 from the side face 43 of the rotating flat screw 40 through the supply channel 22. The material supplied into the material introduction portion 48 is transported into the spiral portion 47 by the rotation of the flat screw 40.

At least a part of the material transported into the spiral portion 47 is melted by the rotation of the flat screw 40, heating by the built-in screw heater 49 in the flat screw 40, and heating by the built-in barrel heater 58 in the barrel 50, whereby the shaping material in a paste form having fluidity is formed.

The shaping material is transported to the central portion 46 in the spiral portion 47 by the rotation of the flat screw 40, and the shaping material is sent out to the sending-out hole 56 from the central portion 46. The shaping material supplied to the nozzle 60 through the sending-out hole 56 is ejected onto the shaping table 300 from the nozzle hole 61. The flowing amount of the shaping material ejected from the nozzle hole 61 is referred to as "ejection amount".

In this embodiment, in the shaping process, the controller 500 controls the temperature of the barrel heater 58 and the temperature of the screw heater 49 so as to satisfy all the conditions from the following Condition (A) to Condition (D). Condition (A): The screw surface temperature Ts is higher than the glass transition point Tg of the material. Condition (B): A relationship among the screw surface temperature Ts, the glass transition point Tg of the material, and the melting point Tm of the material satisfies the following formula (1).

$$Ts \geq Tg + 0.187 \times (Tm - Tg) \quad (1)$$

Condition (C): The barrel surface temperature Tb is lower than the thermal decomposition temperature Td of the material. Condition (D): The screw surface temperature Ts is lower than the barrel surface temperature Tb. In order to satisfy all the conditions from the above-mentioned Condition (A) to Condition (D), the controller 500, for example, controls the temperature of the screw heater 49 by feedback control using the screw surface temperature Ts acquired by the screw temperature sensor 710, and controls the temperature of the barrel heater 58 by feedback control using the barrel surface temperature Tb acquired by the barrel temperature sensor 720. The controller 500 may control the temperature of the screw heater 49 and the temperature of the barrel heater 58 by referring to a map showing the relationship among the temperature of the screw heater 49, the temperature of the barrel heater 58, the screw surface temperature Ts, and the barrel surface temperature Tb, or may control the temperature of the screw heater 49 and the temperature of the barrel heater 58 based on a previously determined function.

FIG. 6 is an explanatory view showing test results by examining a relationship among the barrel surface temperature Tb, the screw surface temperature Ts, and an ejection property of the shaping material from the nozzle 60. In FIG. 6, test results of Sample 1 to Sample 5 performed under different conditions, respectively, are shown. In this test, a relationship among the barrel surface temperature Tb measured using the barrel temperature sensor 720, the screw surface temperature Ts measured using the screw temperature sensor 710, and the ejection property of the shaping material from the nozzle 60 was examined. In FIG. 6, as the test results, symbols "A", "B", and "C" were assigned in descending order of ejection property. When the shaping material ejected from the nozzle 60 is not deteriorated, and also the ejection amount of the shaping material from the nozzle 60 is stable, the ejection property was determined to be favorable. "The shaping material is not deteriorated" means that the property of the shaping material is not changed to such an extent that discoloration or a decrease in strength is caused. "The ejection amount of the shaping material is stable" means that an expected ejection amount from the nozzle 60 is continuously obtained.

In Sample 1, polyether ether ketone (PEEK) in a pellet form was used as the material. Polyether ether ketone is a crystalline thermoplastic resin. Polyether ether ketone has a thermal decomposition temperature Td of 450 degree Celsius, a melting point Tm of 341 degree Celsius, and a glass transition point Tg of 143 degree Celsius. The ejection property of the shaping material from the nozzle 60 was examined by setting the barrel surface temperature Tb to 400 degree Celsius and the screw surface temperature Ts to 180 degree Celsius, and as a result, a favorable ejection property was obtained. In Sample 1, the relationship among the screw surface temperature Ts, the glass transition point Tg of the material, and the melting point Tm of the material was as follows: $(Ts-Tg)/(Tm-Tg)=0.187$.

In Sample 2, the same polyether ether ketone (PEEK) in a pellet form as that of Sample 1 was used as the material. The ejection property of the shaping material from the nozzle 60 was examined by setting the barrel surface temperature Tb to 350 degree Celsius and the screw surface temperature Ts to 160 degree Celsius, and as a result, the material in the groove portion 45 of the flat screw 40 was not sufficiently melted, and the ejection of the shaping material from the nozzle 60 was unstable. In Sample 2, the relationship among the screw surface temperature Ts, the glass transition point Tg of the material, and the melting point Tm of the material was as follows: $(Ts-Tg)/(Tm-Tg)=0.086$.

In Sample 3, the same polyether ether ketone (PEEK) in a pellet form as that of Sample 1 was used as the material. The ejection property of the shaping material from the nozzle 60 was examined by setting the barrel surface temperature Tb to 383 degree Celsius and the screw surface temperature Ts to 170 degree Celsius, and as a result, although a more favorable ejection property than in the case of Sample 2 was obtained, the material in the groove portion 45 of the flat screw 40 was not sufficiently melted, and the ejection of the shaping material from the nozzle 60 was unstable. In Sample 3, the relationship among the screw surface temperature Ts, the glass transition point Tg of the material, and the melting point Tm of the material was as follows: $(Ts-Tg)/(Tm-Tg)=0.136$.

In Sample 4, a polypropylene resin (PP) in a pellet form was used as the material. The polypropylene resin is a crystalline thermoplastic resin. The polypropylene resin has a thermal decomposition temperature Td of 300 degree Celsius, a melting point Tm of 165 degree Celsius, and a glass transition point Tg of 0 degree Celsius. The ejection property of the shaping material from the nozzle 60 was examined by setting the barrel surface temperature Tb to 210 degree Celsius and the screw surface temperature Ts to 87 degree Celsius, and as a result, a favorable ejection property was obtained. In Sample 4, the relationship among the screw surface temperature Ts, the glass transition point Tg of the material, and the melting point Tm of the material was as follows: $(Ts-Tg)/(Tm-Tg)=0.527$.

In Sample 5, an acrylonitrile-butadiene-styrene resin (ABS) in a pellet form was used as the material. The acrylonitrile-butadiene-styrene resin is an amorphous thermoplastic resin. The acrylonitrile-butadiene-styrene resin has a thermal decomposition temperature Td of 260 degree Celsius and a glass transition point Tg of 80 degree Celsius. The ejection property of the shaping material from the nozzle 60 was examined by setting the barrel surface temperature Tb to 210 degree Celsius and the screw surface temperature Ts to 87 degree Celsius, and as a result, a favorable ejection property was obtained. The acrylonitrile-butadiene-styrene resin is an amorphous thermoplastic resin, and therefore does not have a clear melting point Tm.

Therefore, when a crystalline thermoplastic resin is used as the material, in order to realize a favorable ejection property of the shaping material to be ejected from the nozzle 60, it is preferred that the screw surface temperature Ts satisfies the above formula (1).

According to the three-dimensional shaping apparatus 100 of this embodiment described above, by the heating from the screw heater 49 provided in the flat screw 40 and the heating from the barrel heater 58 provided in the barrel 50, the material can be melted to form the shaping material, and therefore, even when the temperature of the barrel heater 58 is set lower than the thermal decomposition temperature of the material, the material in the vicinity of the flat screw 40 is appropriately melted by the screw heater 49, and the shaping material can be stably supplied to the nozzle 60 from the sending-out hole 56. Accordingly, the shaping material can be stably ejected from the nozzle 60 while suppressing deterioration of the material.

Further, in this embodiment, the temperature of the screw heater 49 and the temperature of the barrel heater 58 are controlled by the controller 500 so that the barrel surface temperature Tb is lower than the thermal decomposition temperature Td of the material, and the screw surface temperature Ts is lower than the barrel surface temperature Tb, and also the screw surface temperature Ts is higher than the glass transition point Tg of the material. Therefore, the material in the vicinity of the flat screw 40 can be more reliably melted while more reliably suppressing deterioration of the material in the vicinity of the barrel 50 and in the vicinity of the flat screw 40.

Further, in this embodiment, a crystalline thermoplastic resin is used as the material, and the temperature of the screw heater 49 is controlled so that the screw surface temperature Ts satisfies the above formula (1). Therefore, with respect to the crystalline thermoplastic resin, the material in the vicinity of the flat screw 40 can be more reliably melted.

Further, in this embodiment, the screw temperature sensor 710 is provided at the center in the circumferential direction of the flat screw 40, and the controller 500 controls the temperature of the screw heater 49 using the screw surface temperature Ts acquired by the screw temperature sensor 710. Therefore, the material at the center of the flat screw 40 near the sending-out hole 56 can be appropriately melted, and thus, sending-out failure of the shaping material from the sending-out hole 56 can be more reliably suppressed.

Further, in this embodiment, the heat insulating portion 44 is provided at a position more distant from the barrel 50 than the screw heater 49 in the flat screw 40, and therefore, the heat of the screw heater 49 can be prevented from escaping to the opposite side to the barrel 50. Accordingly, the heat of the screw heater 49 can be more reliably transferred to the material supplied between the flat screw 40 and the barrel 50.

In this embodiment, the material of polyether ether ketone (PEEK) in a pellet form is used, however, as the material used in the ejection unit 200, for example, a material shaping a three-dimensional shaped article using any of various materials such as a material having thermoplasticity, a metal material, and a ceramic material as a main material can also be adopted. Here, the "main material" refers to a principal material for forming the shape of the three-dimensional shaped article and means a material whose content is 50 wt % or more in the three-dimensional shaped article. In the above-mentioned shaping material, a material obtained by melting such a main material singly, or a material formed into a paste by melting a part of the components contained together with the main material is included.

When a material having thermoplasticity is used as the main material, the shaping material is formed by plasticization of the material in the plasticizing portion 90. The "plasticization" refers to melting by applying heat to the material having thermoplasticity. Further, the "melting" also refers to softening by heating the material having thermoplasticity to a temperature not lower than the glass transition point thereof so as to exhibit fluidity.

As the material having thermoplasticity, for example, any one or a combination of two or more of the following thermoplastic resin materials can be used.
Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive such as a wax, a flame retardant, an antioxidant, or a heat stabilizer, or the like may be mixed. The material having thermoplasticity is converted into a plasticized and molten state by the rotation of the flat screw 40, the heating by the screw heater 49, and the heating by the barrel heater 58 in the plasticizing portion 90. The shaping material formed in this manner is cured by decreasing the temperature after being ejected from the nozzle hole 61.

The material having thermoplasticity is desirably injected from the nozzle hole 61 in a completely molten state by being heated to a temperature not lower than the glass transition point thereof. For example, an ABS resin has a glass transition point of about 120° C. and the temperature thereof when it is injected from the nozzle hole 61 is desirably about 200° C. In order to inject the shaping material in a high temperature state in this manner, a heater may be provided around the nozzle hole 61. The "completely molten state" refers to a state where a material having thermoplasticity that is not melted is not present, and for example, when a thermoplastic resin in a pellet form is used as the material, it refers to a state where a solid material in a pellet form does not remain.

In the ejection unit 200, in place of the above-mentioned material having thermoplasticity, for example, the following metal material may be used as the main material. In this case, it is desirable that a component melting when forming the shaping material is mixed in a powder material obtained by pulverizing the following metal material into a powder, and the resulting material is fed to the plasticizing portion 90.
Examples of Metal Material single metals of magnesium (Mg), iron (Fe), cobalt (Co), chromium (Cr), aluminum (Al), titanium (Ti), copper (Cu), and nickel (Ni), or alloys containing one or more of these metals
Examples of Alloy a maraging steel, stainless steel, cobalt-chromium-molybdenum, a titanium alloy, a nickel alloy, an aluminum alloy, a cobalt alloy, and a cobalt-chromium alloy In the ejection unit 200, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material disposed in the shaping table 300 may be cured by, for example, irradiation with a laser or sintering with hot air or the like.

The powder material of the metal material or the ceramic material to be fed to the material supply portion 20 may be a mixed material obtained by mixing a plurality of types of single metal powders or alloy powders or ceramic material powders. Further, the powder material of the metal material or the ceramic material may be coated with, for example, a thermoplastic resin as exemplified above or a thermoplastic resin other than those exemplified above. In this case, the material may be configured to exhibit fluidity by melting the thermoplastic resin in the plasticizing portion 90.

To the powder material of the metal material or the ceramic material to be fed to the material supply portion 20, for example, a solvent as described below can also be added. As the solvent, one type or a combination of two or more types selected from the following solvents can be used.
Examples of Solvent water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl n-butyl ketone, diisopropyl ketone, and acetyl acetone, alcohols such as ethanol, propanol, and butanol, tetra-alkyl ammonium acetates, sulfoxide-based solvents such as dimethyl sulfoxide and diethyl sulfoxide, pyridine-based solvents such as pyridine, γ-picoline, and 2,6-lutidine, tetra-alkyl ammonium acetates (for example, tetra-butyl ammonium acetate, etc.), ionic liquids such as butyl carbitol acetate, and the like In addition thereto, for example, a binder as described below can also be added to the powder material of the metal material or the ceramic material to be fed to the material supply portion 20.

Figure 7:
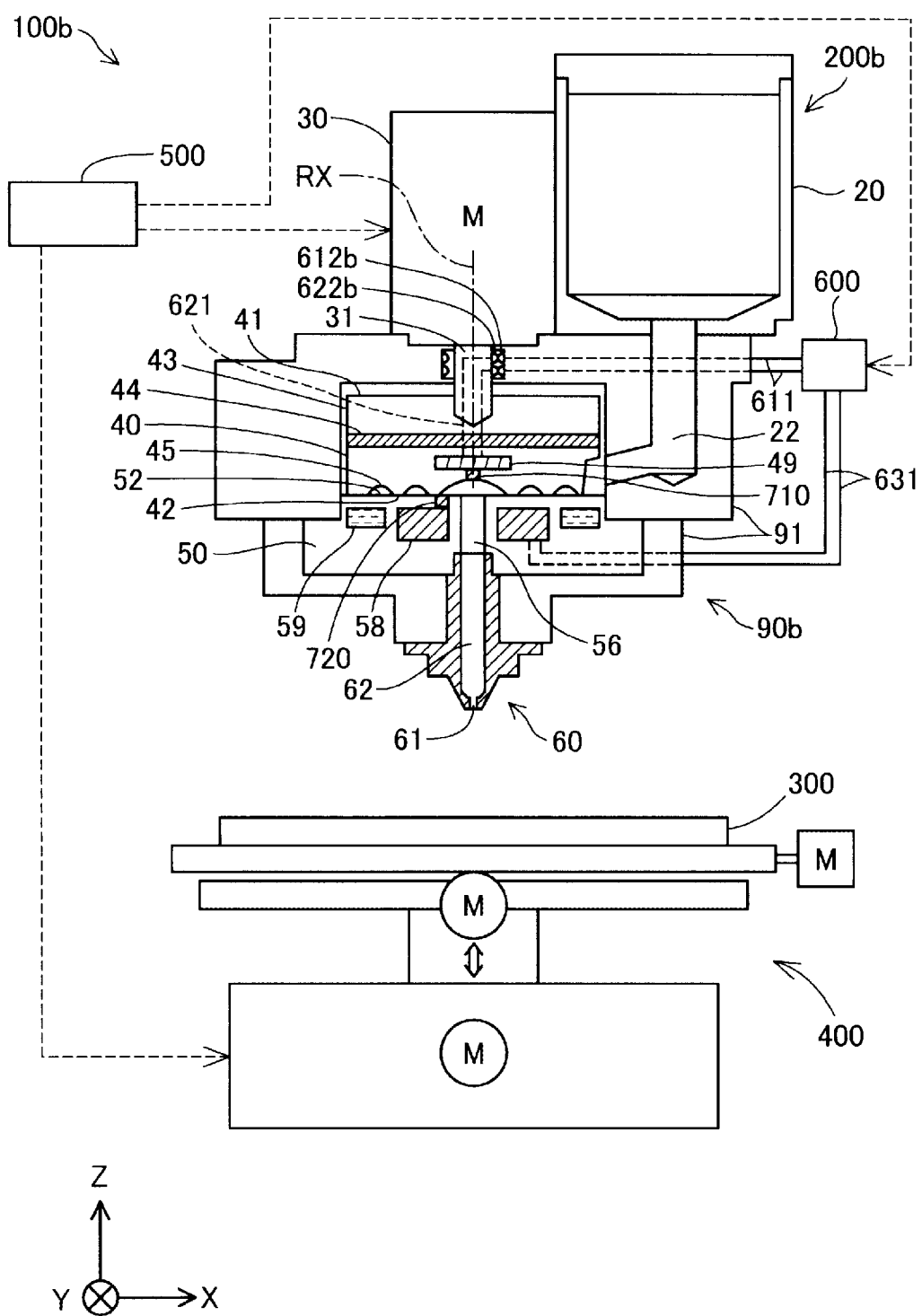
FIG. 7 is an explanatory view showing a schematic configuration of a three-dimensional shaping apparatus in another embodiment.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or other thermoplastic resins B. Other Embodiments (B1) FIG. 7 is an explanatory view showing a schematic configuration of a three-dimensional shaping apparatus 100b as another embodiment. The three-dimensional shaping apparatus 100b as another embodiment is different from that of the first embodiment in that in a plasticizing portion 90b having an ejection unit 200b, a second contact point 622b is provided at a side face of the rotating shaft 31 of the driving motor 30, and the second wiring 621 is coupled to the screw heater 49 through the inside of the rotating shaft 31 of the driving motor 30. The other configuration is the same as that of the first embodiment shown in FIG. 1 unless otherwise described. A first contact point 612b is provided at a face of the screw case 91 opposed to the rotating shaft 31 of the driving motor 30. It is formed in an annular shape along the outer circumference of the rotating shaft 31 of the driving motor 30. Therefore, even during the rotation of the flat screw 40, a state where the first contact point 612b and the second contact point 622b are in contact with each other is ensured, and an electric power is supplied from the power supply source 600 to the screw heater 49. According to the three-dimensional shaping apparatus 100b of this embodiment, even during the rotation of the flat screw 40, an electric power can be supplied to the screw heater 49 from the power supply source 600 provided outside the flat screw 40.

(B2) In the three-dimensional shaping apparatus 100 of the above-mentioned first embodiment, in the flat screw 40, the heat insulating portion 44 is provided. On the contrary, in the flat screw 40, the heat insulating portion 44 need not be provided. Even in this case, the material in the vicinity of the flat screw 40 is appropriately melted by heating from the screw heater 49 and heating from the barrel heater 58 while suppressing deterioration of the material in the vicinity of the barrel 50, and the shaping material can be supplied to the nozzle 60.

(B3) In the three-dimensional shaping apparatus 100 of the above-mentioned first embodiment, when, for example, an amorphous thermoplastic resin such as an acrylonitrile-butadiene-styrene resin (ABS) is used as the material, the controller 500 may control the temperature of the screw heater 49 and the temperature of the barrel heater 58 so as to satisfy all the Condition (A), Condition (C), and Condition (D), excluding Condition (B) described above. In this case, even if an amorphous thermoplastic resin that does not have a melting point Tm is used, the material in the vicinity of the flat screw 40 is appropriately melted while suppressing deterioration of the material in the vicinity of the barrel 50, and the shaping material can be supplied to the nozzle 60.

(B4) In the three-dimensional shaping apparatus 100 of the above-mentioned first embodiment, the surface temperature of the groove portion 45 on the central axis RX of the flat screw 40 is used as the screw surface temperature Ts. On the other hand, the screw surface temperature Ts may be the surface temperature of the groove portion 45 included in a region within ⅓ of the radius of the flat screw 40 from the central axis RX of the flat screw 40. Even in this case, the material in the vicinity of the flat screw 40 is appropriately melted by heating from the screw heater 49 and heating from the barrel heater 58 while suppressing deterioration of the material in the vicinity of the barrel 50, and the shaping material can be supplied to the nozzle 60.

C. Other Aspects

The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to a first aspect of the present disclosure, a plasticizing apparatus for plasticizing a material to form a molten material is provided. The plasticizing apparatus includes a screw having a groove formed face, in which a groove portion in a spiral shape to be supplied with the material is formed, and a first heating portion heating the material, and a barrel having a screw opposed face, which is a face opposed to the groove formed face, and in which a sending-out hole for sending out the molten material is formed at a center, and a second heating portion heating the material.

According to the plasticizing apparatus of this aspect, the material in the vicinity of the screw is appropriately melted and can be stably sent out from the sending-out hole by heating from the first heating portion provided in the screw and heating from the second heating portion provided in the barrel while suppressing deterioration of the material in the vicinity of the barrel. Therefore, the molten material can be stably sent out from the sending-out hole while suppressing deterioration of the material.

(2) In the plasticizing apparatus of the above aspect, the first heating portion and the second heating portion may perform the heating so that a surface temperature Tb at the screw opposed face of the barrel is lower than a thermal decomposition temperature Td of the material, and a surface temperature Ts in the groove portion of the screw is lower than the surface temperature Tb at the screw opposed face of the barrel, and also the surface temperature Ts in the groove portion of the screw is higher than a glass transition point Tg of the material.

According to the plasticizing apparatus of this aspect, the material in the vicinity of the screw can be more reliably melted while more reliably suppressing deterioration of the material in the vicinity of the barrel and in the vicinity of the screw.

(3) In the plasticizing apparatus of the above aspect, when a crystalline thermoplastic resin is used as the material, the first heating portion and the second heating portion may perform the heating so that the surface temperature Tb at the screw opposed face of the barrel is lower than the thermal decomposition temperature Td of the material, and a relationship among the surface temperature Ts in the groove portion of the screw, the glass transition point Tg of the material, and a melting point Tm of the material satisfies the following formula (1).

$$Ts \geq Tg + 0.187 \times (Tm - Tg) \quad (1)$$

According to the plasticizing apparatus of this aspect, with respect to the crystalline material, the material in the vicinity of the screw can be more reliably melted.

(4) In the plasticizing apparatus of the above aspect, the groove portion of the screw may have a central portion opposed to the sending-out hole and a spiral portion extending in a spiral shape toward an outer circumference from the central portion, and the surface temperature Ts in the groove portion of the screw may be a temperature in the central portion.

According to the plasticizing apparatus of this aspect, the material can be appropriately melted in the central portion of the screw near the sending-out hole, and therefore, the molten material can be more stably sent out from the sending-out hole.

(5) In the plasticizing apparatus of the above aspect, the screw may have a heat insulating portion at a position more distant from the barrel than the first heating portion.

According to the plasticizing apparatus of this aspect, heat from the first heating portion is prevented from escaping to the opposite side to the barrel, and therefore, the heat of the first heating portion can be more reliably transferred to the material supplied between the screw and the barrel.

(6) According to a second aspect of the present disclosure, a plasticizing method for plasticizing a material to form a molten material is provided. The plasticizing method includes supplying the material between a screw having a groove formed face, in which a groove portion in a spiral shape is formed, and a first heating portion heating the material, and a barrel having a screw opposed face, which is a face opposed to the groove formed face, and in which a sending-out hole for sending out the molten material is formed at a center, and a second heating portion heating the material, and heating the material using the first heating portion and the second heating portion.

According to the plasticizing method of this aspect, the material in the vicinity of the screw is appropriately melted and can be stably sent out from the sending-out hole by heating by the first heating portion in the screw and heating by the second heating portion in the barrel while suppressing deterioration of the material in the vicinity of the barrel. Accordingly, the molten material can be stably sent out from the sending-out hole while suppressing deterioration of the material.

(7) According to a third aspect of the present disclosure, a three-dimensional shaping apparatus is provided. The three-dimensional shaping apparatus includes a nozzle ejecting a molten material, a plasticizing portion including a screw having a groove formed face, in which a groove portion in a spiral shape to be supplied with the material is formed, and a first heating portion heating the material, and a barrel having a screw opposed face, which is a face opposed to the groove formed face, and in which a sending-out hole communicating with the nozzle is formed at a center, and a second heating portion heating the material, and a controller controlling the first heating portion and the second heating portion.

According to the three-dimensional shaping apparatus of this aspect, the material in the vicinity of the screw is appropriately melted and can be stably supplied to the nozzle by heating from the first heating portion provided in the screw and heating from the second heating portion provided in the barrel while suppressing deterioration of the material in the vicinity of the barrel. Accordingly, the molten material can be stably ejected from the nozzle while suppressing deterioration of the material.

The present disclosure can also be realized in various aspects other than the plasticizing apparatus. For example, it can be realized in aspects of a plasticizing method, a three-dimensional shaping apparatus, etc.

What is claimed is:

1. A plasticizing apparatus for plasticizing a material to form a molten material, comprising:
    a screw having
        a first body portion,
        a second body portion, wherein the second body portion has a groove formed face in which a groove portion in a spiral shape to be supplied with the material is formed,
        a first heater configured to heat the material, and
        a heat insulating portion between the first body portion and the second body portion; and
    a barrel having
        a screw opposed face, which is a face opposed to the groove formed face, and in which a sending-out hole for sending out the molten material is formed at a center, and
        a second heater configured to heat the material, wherein the second heater is different from the first heater.

2. The plasticizing apparatus according to claim 1, wherein the first heater and the second heater perform the heating so that a surface temperature Tb at the screw opposed face of the barrel is lower than a thermal decomposition temperature Td of the material, and a surface temperature Ts in the groove portion of the screw is lower than the surface temperature Tb at the screw opposed face of the barrel, and also the surface temperature Ts in the groove portion of the screw is higher than a glass transition point Tg of the material.

3. The plasticizing apparatus according to claim 2, wherein when a crystalline thermoplastic resin is used as the material, the first heater and the second heater perform the heating so that the surface temperature Tb at the screw opposed face of the barrel is lower than the thermal decomposition temperature Td of the material, and a relationship among the surface temperature Ts in the groove portion of the screw, the glass transition point Tg of the material, and a melting point Tm of the material satisfies following formula (1):

$$Ts \geq Tg + 0.187 \times (Tm - Tg) \qquad (1).$$

4. The plasticizing apparatus according to claim 2, wherein
    the groove portion of the screw has a central portion opposed to the sending-out hole and a spiral portion extending in the spiral shape toward an outer circumference from the central portion, and
    the surface temperature Ts in the groove portion of the screw is a temperature in the central portion.

5. The plasticizing apparatus according to claim 1, wherein the screw further has the heat insulating portion at a position more distant from the barrel than the first heater.

6. The plasticizing apparatus according to claim 1, further comprising:
    a screw temperature sensor acquiring a surface temperature Ts in the groove portion of the screw;
    a barrel temperature sensor acquiring a surface temperature Tb of the screw opposed face; and a controller controlling
- the first heater using the surface temperature Ts in the groove portion of the screw acquired by the screw temperature sensor, and
- the second heater using the surface temperature Tb of the screw opposed face acquired by the barrel temperature sensor.

\* \* \* \* \*